(12) United States Patent
Janke

(10) Patent No.: US 7,698,572 B2
(45) Date of Patent: Apr. 13, 2010

(54) SECURITY MODULE WITH VOLATILE MEMORY FOR STORING AN ALGORITHM CODE

(75) Inventor: Marcus Janke, München (DE)

(73) Assignee: Infineon Technologies AG, Neubiberg (DE)

(*) Notice: Subject to any disclaimer, the term of this patent is extended or adjusted under 35 U.S.C. 154(b) by 886 days.

(21) Appl. No.: 10/620,108

(22) Filed: Jul. 15, 2003

(65) Prior Publication Data
US 2004/0083380 A1    Apr. 29, 2004

Related U.S. Application Data

(63) Continuation of application No. PCT/EP02/00733, filed on Jan. 24, 2002.

(30) Foreign Application Priority Data
Feb. 16, 2001    (DE) ................. 101 07 373

(51) Int. Cl.
G06F 12/14 (2006.01)
G06F 11/00 (2006.01)
G06F 11/30 (2006.01)
G06F 1/26 (2006.01)

(52) U.S. Cl. .................. 713/193; 713/194; 713/189; 726/34; 726/36

(58) Field of Classification Search ................. 713/175, 713/189, 193, 194; 726/34, 36
See application file for complete search history.

(56) References Cited

U.S. PATENT DOCUMENTS

| | | | |
|---|---|---|---|
| 4,720,860 A * | 1/1988 | Weiss ......................... | 713/184 |
| 4,777,355 A | 10/1988 | Takahira | |
| 5,103,478 A * | 4/1992 | Matyas et al. ............... | 380/280 |
| 5,420,412 A | 5/1995 | Kowalski | |
| 5,757,909 A * | 5/1998 | Park ........................... | 380/201 |
| 5,768,382 A * | 6/1998 | Schneier et al. ............. | 380/251 |

FOREIGN PATENT DOCUMENTS

| | | |
|---|---|---|
| DE | 35 87 513 T2 | 10/1985 |
| EP | 0 157 416 B1 | 10/1985 |

(Continued)

OTHER PUBLICATIONS

Wolfgang Rankl et al.: "Handbuch der Chipkarten—Funktionsweise—Einsatz von Smart Cards" [textbook for chip cards—function—use of smart cards], *Carl Hanser Verlag*, Munich, Germany, 1999, pp. 191-193-252-261.

*Primary Examiner*—Zachary A Davis
(74) *Attorney, Agent, or Firm*—Dickstein, Shapiro, LLP.

(57) ABSTRACT

A security module for use with a terminal comprises a data interface adapted to be coupled to a terminal, for receiving at least part of an algorithm code or the complete algorithm code from the terminal, and a power interface for receiving supply power. A volatile memory coupled to the power interface in order to have power supplied thereto stores the part of the algorithm code or the complete algorithm code received via the data interface. A processor performs, the algorithm code in order to obtain an algorithm code result that can be delivered to the terminal. Due to storing at least part of an algorithm code in the volatile memory of the security module, the algorithm code of the security module is effectively protected against being detected by spying from a potential attacker.

15 Claims, 3 Drawing Sheets

FOREIGN PATENT DOCUMENTS

| | | |
|---|---|---|
| EP | 0 798 673 A1 | 10/1997 |
| JP | 9 006 232 | 1/1997 |
| JP | 11 338 993 | 12/1999 |
| JP | 11338993 A * | 12/1999 |
| JP | 2000-011101 | 1/2000 |
| JP | 2000 076 139 | 3/2000 |
| WO | 98/29830 | 7/1998 |
| WO | 98/43212 | 10/1998 |

* cited by examiner

US 7,698,572 B2

SECURITY MODULE WITH VOLATILE MEMORY FOR STORING AN ALGORITHM CODE

CROSS-REFERENCE TO RELATED APPLICATION

This application is a continuation of copending International Application No. PCT/EP02/00733, filed Jan. 24, 2002, which designated the United States and was not published in English.

BACKGROUND OF THE INVENTION

1. Field of the Invention

The present invention relates to security modules, as employed for example for pay TV applications, credit cards, telephone cards or as TPM plug-in cards, and refers in particular to securing the algorithm code that is employed for the communication between security module and terminal against external attacks.

2. Description of the Related Art

With the increasing advent of cashless payment traffic and the increase of information network-technology even in individual households, such as e.g. in case of pay TV applications, there is an increasing demand for cryptographic algorithms in order to be able to perform digital signatures, authentications and encryption tasks. Known cryptographic algorithms comprise asymmetric encryption algorithms, such as e.g. the RSA algorithm, symmetric encryption processes, such as e.g. the DSE process, as well as processes based on elliptic curves.

In order to be able top perform the computations prescribed by the cryptographic algorithms in everyday life with an acceptable speed on the one hand and in as convenient manner for the user as possible on the other hand, chip cards, such as smart cards or signature cards, are employed comprising an individually provided cryptographic processor for implementing the cryptographic algorithm. Depending on the particular application or use, the cryptographic processor must be capable of performing authentications, signatures, certifications and encryptions or decryptions in accordance with different cryptographic algorithms. In addition to implementation of the cryptographic algorithms, the chip card contains stored, chip card-specific information, such as a secret key and, in case of a credit card, the credit card number, the account number and the balance and, in case of a pay TV smart card, a smart card ID, a customer ID and other customer-specific information. A chip card enables the user of the chip card to carry out certain transactions, such as e.g. debiting, on specifically provided terminals or other end apparatus, such as pay TV decoders, in simple and efficient manner. In this regard, the cryptographic algorithms implemented on the chip card provide for protection of the chip card traffic against criminal manipulations.

For protecting chip card terminal systems against criminal manipulations, specific protocols are employed between the terminal and the chip card, comprising e.g. mutual authentication as well as encryption and decryption operations making use of the cryptographic algorithms implemented in the cryptographic processor. A problem with conventional chip cards is that the algorithms used for the secret functions, e.g. for encryption, are fixedly provided on the chip card in the form of fixed wiring and/or in a stored form and are thus susceptible to being determined by spying performed by potential attackers. Determining cryptographic algorithms implemented in chip cards by an attacker comprises, for example, the chemical removal of the circuit structure of the cryptographic processor and the optical analysis of the exposed semiconductor structures. If an attacker, by way of the chip card in his possession, succeeds in obtaining the cryptographic algorithm implemented therein, the attacker will be in the position, due to his knowledge of the cryptographic algorithm and thus by the possibility of implementing the same, to carry out certain attacks against the chip card in order to obtain the secret data, such as the secret key or other data of crucial security of the chip card. When the underlying cryptographic algorithm is known, the attacks have a by far greater chance of success, and consequently the security chain of the chip card traffic is at risk.

With conventional chip cards, the problem of spying is counteracted merely by specific hardware processes or technologies, such as by the hidden contact process. In the case of this process, attempts are made to prevent the optical analysis, of removed semiconductor structures. By preventing such an optical analysis, one can prevent the occurrence of a conclusion relating to the underlying electronic circuit by means of hidden contacts and by the use of specific layout libraries for the underlying gates, in which different gates, such as AND gates and OR gates, differ from each other merely by different doping. These hardware concealing measures indeed increase the expenditure required by a potential attacker for finding out the underlying cryptographic algorithms, but on the other hand also increase the circuitry and design expenditure, and the chip area, and thus the costs of the cryptographic processor and the chip card, respectively.

A chip card with increased security against foreign attacks and reduced circuit expenditure is very attractive for chip card manufacturers in particular with regard to the high market potential and the large numbers of pieces in which chip cards are produced.

SUMMARY OF THE INVENTION

It is the object of the present invention to make available a security module, a terminal and a process such that security module traffic with a higher level of security may be ensured.

In accordance with a first object of the invention, there is provided a security module for use with a terminal, comprising a data interface adapted to be coupled to a terminal, for receiving at least part of an algorithm code or of the complete algorithm code from the terminal, with the algorithm code concerning a processing of secrets, a power interface for receiving power from the terminal; a volatile memory for storing the part of the algorithm code or the complete algorithm code received via the data interface, the volatile memory being coupled to the power interface in order to have power supplied thereto such that the volatile memory will be cleared upon an interruption of the receipt of the power from the terminal; and a processor for performing the algorithm code in order to obtain an algorithm code result that can be delivered to the terminal.

In accordance with a second aspect of the invention, this aspect is achieved by a terminal for use with a security module, comprising: a data interface adapted to be coupled to the security module, for transmitting at least part of an algorithm code or the complete algorithm code from the terminal to a volatile memory of the security module and for receiving the algorithm code result from the security module, with the algorithm code concerning a processing of secrets; and an energy interface for delivering supply energy to the security module, with the volatile memory being supplied by the supply energy, such that the same will be cleared upon an interruption of the receipt of the supply energy from the terminal, with the terminal, for each communication operation between terminal and security module during one and the same communication operation with the security module, being designated to send at least the part of the algorithm code or the complete algorithm code to the volatile memory of the security module; and, subsequently, during the further communication process, receive the algorithm code result from the security module.

In accordance with a third object of the invention, there is provided a process for computing an algorithm code result using a security module, comprising the steps of: receiving at least part of an algorithm code or the complete algorithm code by means of an interface, with the algorithm code concerning a processing of secrets; volatile-storing said part of the algorithm code or said complete algorithm code in a volatile memory of the security module, with the volatile memory being coupled to the interface, to be supplied with power, such that the same will be cleared upon an interruption of the receipt of the power from the terminal: performing said algorithm code on the security module in order to obtain an algorithm code result; delivering said algorithm code result to the terminal; and clearing said volatile memory upon an interruption of the receipt of the power from the terminal.

In accordance with a fourth object of the invention, there is provided a process for controlling a security module using a terminal in order to obtain an algorithm code result from the security module, with the process comprising for each communication operation, performing the following steps during one and the same communication operation with the security module: delivering power from the terminal to the security module; transmitting at least part of an algorithm code or the complete algorithm code from the terminal to a volatile memory of the security module; with the algorithm code concerning a processing of secrets, with the volatile memory being supplied by the power, such that the same will be cleared upon an interruption of the receipt of the power from the terminal; and receiving the algorithm code result from the security module.

In accordance with a fifth object of the invention, there is provided a process for communication between a security module and a terminal, comprising the steps of: transferring at least part of an algorithm code or the complete algorithm code from the terminal to the security module, with the algorithm code concerning a processing of secrets; volatile-storing said part of the algorithm code or said complete algorithm code in a volatile memory of the security module, with the volatile memory being supplied by the power, such that the same will be cleared upon interruption of the receipt of the power from the terminal; performing said algorithm code on the security module in order to obtain an algorithm code result; delivering said algorithm code result to the terminal; and clearing said volatile memory upon an interruption of the receipt of the power from the terminal.

The present invention is based on the finding that the security of a security module, such as e.g. a chip card, against foreign attacks may be enhanced in that at least part of the algorithm code is not fixedly stored on the security module, but rather that this missing part of the algorithm code is stored in a volatile memory of the security module during communication between the terminal and the security module only, with the algorithm code comprising functions of crucial security, such as debiting functions, or cryptographic algorithms or concerning the processing of secrets in general. It is thus effectively prevented that the complete algorithm code is provided on a security module in the power of a potential attacker, and consequently it will become impossible for the potential attacker to access the algorithm code in order to spy out secret keys or other secret data, and to run or perform the same in accordance with specific attack processes, using e.g. fault attacks or information leakage attacks. In other words, it will be made nearly impossible to a potential attacker to utilize the algorithm code, such as an encryption algorithm, in abusive manner since this code is not permanently stored on the security module in complete form and thus, outside the utilization at a corresponding terminal, is not in the possession of the attacker.

According to the invention, a security module, such as a chip card, comprises a TPM (Trusted Platform Module) in the form of a computer plug-in module or a smart card, for use with a terminal in addition to a data interface adapted to be coupled to the terminal and receiving from the terminal at least part of the algorithm code or the complete algorithm code, a power interface receiving power, as well as a volatile memory for storing the part of the algorithm code received via the data interface or of the complete algorithm code received, with the volatile memory being coupled to the power interface in order to have power supplied thereto. A processor performs the algorithm code in order to obtain an algorithm code result that can be delivered to the terminal.

The remainder of the algorithm code that has not been received may be stored, for example, in a non-volatile memory, such as a ROM, of the security module. If there is not sufficient power being supplied, there is thus no complete algorithm code contained in the non-volatile memory of the security module, and consequently there is no complete algorithm code available to be run by a potential attacker.

A terminal suitable for use with the security module described hereinbefore, such as e.g. an automatic cash dispenser, a mobile telephone with card reader, a pay TV decoder or a computer having a plug-in place for a TPM, comprises for example a data interface that is adapted to be to the security module and transmits the part of the algorithm code or the complete algorithm code from the terminal to the volatile memory of the security module and receives the algorithm code result from the security module, as well as a power interface delivering the power to the security module.

According to a specific embodiment, an authentication, such as an authentication according to the challenge and response scheme, is carried out between the terminal and the security module during a communication between the terminal and the security module. The transfer of the algorithm code from the terminal to the security module is carried out in encrypted and certified form in order to counteract eavesdropping and manipulation of the communication connection between terminal and security module. The terminal or the security module to this end contains suitable means for performing authentication, encryption and decryption as well as certification and certification examination, respectively. For increased security and for effectively preventing access of a potential attacker to the transferred part of the algorithm code, the security module may have in addition a monitoring means which, if predetermined security conditions are fulfilled, clears the volatile memory. Such security conditions may comprise the interruption, an irregularity and a fluctuation in the supply voltage and/or the processor or system clock or other operating parameters as they may be effected by manipulation of the security module while the security module interacts with the terminal. In the event that the monitoring means has not effected preliminary clearing of the memory, the volatile memory and thus the stored part of the algorithm code is cleared at the latest upon the termination of the communication between the terminal and the security module or upon the interruption of the power being supplied, respectively, such as e.g. by withdrawal or the removal of the security module from the terminal, This cleared part of the algorithm code is then no longer available to a potential attacker for being run within specific attacks.

In order to further reduce the vulnerability to attack of the system, it may be provided to transfer the part of the algorithm code from the terminal to the security module intermittently and repeatedly in modified form and, in doing so, to store each time the newly transferred, altered part of the algorithm code in the volatile memory instead of the old stored part of the algorithm code. This renders possible changes in a cryptographic algorithm during the communication between the terminal and the security module, such as e.g. in the case of pay TV applications, but also enables changes in the algorithm code each time upon an initialization of a terminal-security module communication, such as e.g. in the case of credit cards, Then it is even more difficult for a potential attacker to find out the algorithm code employed.

In addition to protecting the algorithm code of the security module against spying by a potential attacker, an additional advantage of the present invention is that it is applicable to a multiplicity of application fields, such as e.g. EC (Electronic Cash) cards, credit cards, multi-application cards or pay TV smart cards. Depending on the particular application, the algorithm code or security function code received by the security module contains parts of a code for functions of crucial security or one or more cryptographic algorithms of the security module. For chip card producers or producers of security modules, the versatile applicability as well as the enhanced security against potential attacks means increased acceptance in the market and thus an increased market share. In addition thereto, the security of the security module is increased in an inexpensive manner as the increased security is achieved by software loading of the volatile memory. The conventional and complex hardware measures for protecting the algorithm code against potential attackers, as described hereinbefore, may either be carried out in addition to or may be replaced by less expensive hardware techniques since the functions of crucial security or the underlying cryptographic algorithm of the security module are not permanently provided on the chip card.

Further developments and further alternative embodiments of the present invention are defined in the attached dependent claims.

BRIEF DESCRIPTION OF THE DRAWINGS

Preferred embodiments of the present invention will be elucidated in detail hereinafter with reference to the accompanying drawings in which.

DETAILED DESCRIPTION OF THE PREFERRED EMBODIMENTS

It is pointed out that the following detailed description of specific embodiments of the present invention refers to chip card applications by way of example only, and that the present invention is also applicable to other security modules, such as TPMs in the form of plug-in cards; the following description may easily be transferred to such applications. Accordingly, the following description also refers to terminals for chip cards, such as e.g. cash dispensing machines, for example although, a terminal according to the present invention, in other fields of application, may also be a computer, for example, having a TPM in the plug-in slots thereof, or a mobile telephone with a smart card in the card reader thereof. The terminal could also be an arbitrary apparatus capable of communicating with the security module.

Figure 1:
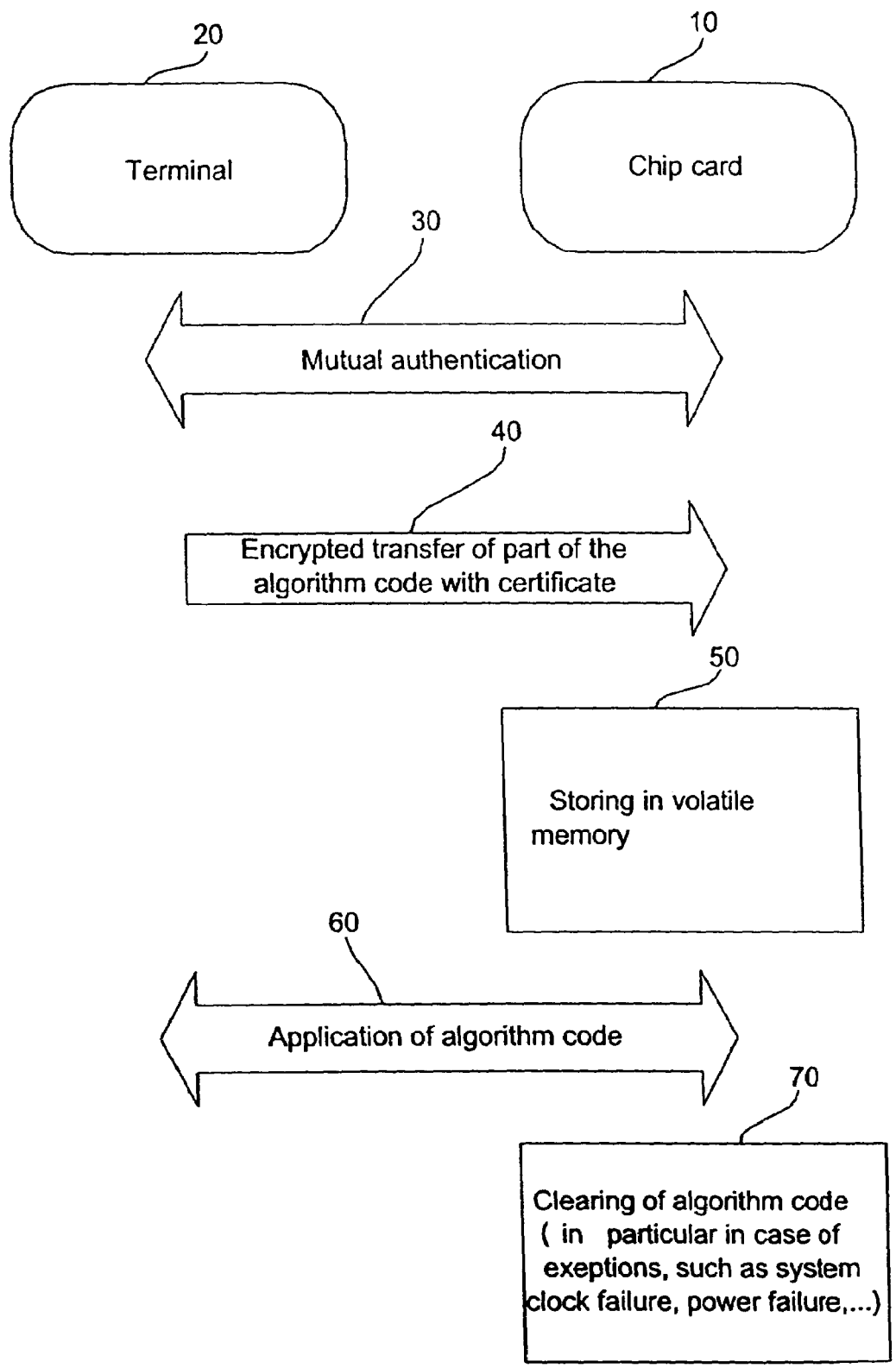
FIG. 1 shows a schematic diagram illustrating the sequence of operations during communication of a chip card with a terminal according to the present invention.

Reference is made first to FIG. 1, illustrating the sequence of operations during communication between a terminal and a chip card, as it results for example when a chip card is introduced into a terminal. In case of chargeable radio broadcasting, the chip card may be, for example, a pay TV smart card and the terminal may be the respective end apparatus or decoder of a pay TV customer. In the event the chip card is a credit card, the terminal is a cash dispensing machine, for example.

FIG. 1 illustrates the chip card 10 and the terminal 20 beside each other in the form of rectangles with rounded corners. Underneath the same, the various steps carried out during communication or interaction of the chip card 10 with the terminal 20 are shown schematically by arrows and blocks in downward direction in the sequence of their occurrence. The directions of the arrows indicate the directions of the data flows in which the data are transmitted, whereas the blocks represent measures performed in the chip card 10.

The steps illustrated in FIG. 1 have the prerequisite that a communication is already possible between the terminal and the chip card which, for example, may be the case upon the introduction of the chip card into the terminal; in this regard, the terminal 20 may be a contactless or contact terminal, and the communication connection thus may take place without contact or via a contact. It is necessary furthermore for communication that chip card 10 be supplied with energy from terminal 20, which may also be carried out in a contactless manner via electromagnetic radiation or via a contact. After the communication connection between the terminal 20 and the chip card 10 has been established and power has been supplied to chip card 10, initializing steps may be carried out first, such as e.g. the mutual agreement on the relevant protocol etc.

After the steps (not shown) of supplying energy to the chip card 10, establishing the communication connection as well as initializing the communication between the terminal 20 and the chip card 10, mutual authentication between the terminal 20 and the chip card 10 is carried out in a step 30, e.g. an authentication in accordance with the challenge and response process. The mutual authentication may comprise, for example, the inputting of a PIN (Personal Identification Number) by the card user, in which the mutual authentication 30 makes use, for example, of chip card-specific data stored on the chip card 10, such as e.g. a chip card identification number and a personal identification number, in connection with a chip card key stored on the chip card as well as an authentication code stored on the chip card and representing a cryptographic algorithm, such as e.g. a symmetric or an asymmetric cryptographic algorithm. The authentication serves to make sure that only admitted chip cards may communicate with admitted terminals. If the authentication yields an error, the communication connection is terminated.

Upon successful mutual authentication 30, the terminal 20 in a step 40 transmits part of the algorithm code to the chip card 10 in encrypted and certified form. The encryption of the transferred part of the algorithm code protects the transmission against eavesdropping by a potential attacker, while the certification in the terminal 20 of the chip card 10 is to provide a guarantee as to the origin of the transferred part of the algorithm code. For decryption of the transferred part of the algorithm code and for examining the certificate as well as for performing the mutual authentication 30, the chip card 10 comprises suitable authentication, decryption and certificate examining means which are constituted by part of the hardware and by codes stored in a non-volatile memory of the chip card, such as e.g. the authentication code. The cryptographic algorithms underlying said mutual authentication 30 and said encryption and certification 40 may comprise symmetric or asymmetric cryptographic processes, such as e.g. the RSA or the DES algorithm or an arbitrary other cryptographic algorithm.

In case the certificate examination reveals that the certificate lacks genuineness; the communication between the terminal 20 and the chip card 10 is interrupted, and there may be provisions made such that the chip card 10 does no longer operates for a predetermined period of time. It is thus prevented that a potential attacker taps the communication connection between the terminal 20 and the chip card 10 and enters a "false" code to the volatile memory of the chip card 10 which, upon performing by the chip card 10, could effect the outputting of secret data stored on chip card 10, for example.

If the certificate examination revealed the genuineness of the certificate, the transferred part of the algorithm code is then stored, in a step 50, in a volatile memory of the chip card 10 either in encrypted or in decrypted form. Depending on whether there is encrypted or decrypted storage, the algorithm code is decrypted before the storage thereof or before the execution by a cryptographic processor on chip card 10. The algorithm code having a part thereof transferred in step 40 may comprise the program code of one or a plurality of functions of crucial security of the chip card 10, such as e.g. a debiting or crediting function for charging or discharging the chip card 10, or the program code for performing a cryptographic algorithm necessary during the further communication sequence, such as e.g. a symmetric or asymmetric cryptographic process, an RSA algorithm, encryption according to the DES, an elliptic curve process or another secret algorithm, however without restriction to these examples. In the event of a pay TV application, the algorithm code comprises, for example, information with respect to decryption of the television data of a chargeable program, such as e.g. the repermutation of the image lines of an image of the television data. Consequently, the algorithm code to be protected is present in complete form on chip card 10 only during the time of execution of the communication between terminal 20 and chip card 10.

In a step 60, the algorithm code now contained in complete form on chip card 10 is utilized and performed by a processor provided on the chip card 10. In the afore-mentioned pay TV example, the processor of chip card 10 performs, for example, the repermutation of the image lines of the television images by way of the algorithm code stored. In a debit application of the chip card 10, such as e.g. with telephone cards, the algorithm code indicating a debiting or crediting function is used for example for crediting or debiting a balance provided on the chip card 10. With credit card applications, step 60 comprises for example the performing of the algorithm code indicating a cryptographic algorithm by means of a cryptographic processor of chip card 10 in order to place money transfer orders, for example.

In a step 70, the part of the algorithm code stored in the volatile memory is cleared again. Clearing of the algorithm code may be effected, for example, by the card user taking the chip card 10 out from terminal 10 and thus interrupting the delivery of power from terminal 20 to chip card 10. In order to prevent potential attackers from protecting the volatile memory, e.g. to prevent a RAM, from losing the stored part of the algorithm code (whereby-if successful, these attackers would come into possession of the complete algorithm code), the chip card 10 may have a specific monitoring means provided thereon. This monitoring means actively clears the volatile memory of the chip card 10 if a monitoring operation reveals that specific security conditions are fulfilled, such as an interruption of the system clock, or the interruption of the delivery of power or if there are other indications of a possible attack, such as voltage fluctuations or the like. Consequently, the algorithm code, after utilization of the chip card 10 in the terminal 20 or interference with the communication sequence, is no longer present on the chip card 10 and thus is no longer exposed either to potential attacks and spying by potential attackers. An attacker in possession of the chip card cannot carry out security computations on the basis of the complete algorithm code since the latter is not completely accessible by the attacker. Spying to gain access to keys or algorithms is thus effectively prevented.

After the sequence of operations during communication of a chip card with a terminal has been described with reference to FIG. 1, various possibilities will be described first hereinafter as to which parts of an algorithm code are transferred from the terminal to the volatile memory of the chip card. In the event that the algorithm code contains the program code of a secret, not yet known cryptographic algorithm, it may be advantageous for example to completely transfer the algorithm code from the terminal to the volatile memory of the chip card, whereby this secret cryptographic algorithm would be effectively protected against spying out by a potential attacker.

In the event that the part transmitted or transferred of the algorithm code contains part of a program code of a known cryptographic algorithm, the transferred part of the program code comprises, for example, memory addresses in which the computation components underlying the cryptologic computation are stored, thereby effectively preventing that a potential attacker in possession of the chip card can perform the security computations based on this cryptographic algorithm, since the required memory addresses for performing the program code and for performing the memory accessing operations by the processor of the chip card, which are necessary therefor, are missing.

In the event of a known cryptographic algorithm, the transferred part of the algorithm code may contain jump addresses pointing either as a start address to the beginning of a specific program code or as conditional or unconditional program jumps to the beginnings of specific partial routines. Without knowing these jump addresses, it is rendered very difficult for an attacker to spy out the chip card in his possession.

In a specific example, a plurality of program codes for various cryptographic algorithms may be provided on the chip card 10, with the transferred part of the algorithm code containing a start address of a specific one of the various cryptographic algorithm program codes that has just been selected by the terminal. The terminal selects, for example, for each new chip card terminal communication operation a new cryptographic algorithm from the plurality of cryptographic algorithms, or the selection is carried out anew dynamically several times during a communication operation in order to dynamically alter the cryptographic algorithm selected.

It may be provided furthermore that the transferred part of the algorithm code contains start addresses, jump addresses or memory addresses of a program code that is necessary for debiting or crediting or for other functions of crucial security of the chip card. It is possible, furthermore, that steps 40, 50 and 60 illustrated in FIG. 1 are repeated, with the transferred part of the algorithm code being altered in a predetermined way. In each pass, the old part of the algorithm code stored in the volatile memory of the chip card is written over with the new transferred part of the algorithm code, which then is performed or run by the processor of the chip card. By way of this dynamic modification of the part of the algorithm code stored in the volatile memory, there is additional security obtained.

Figure 2:
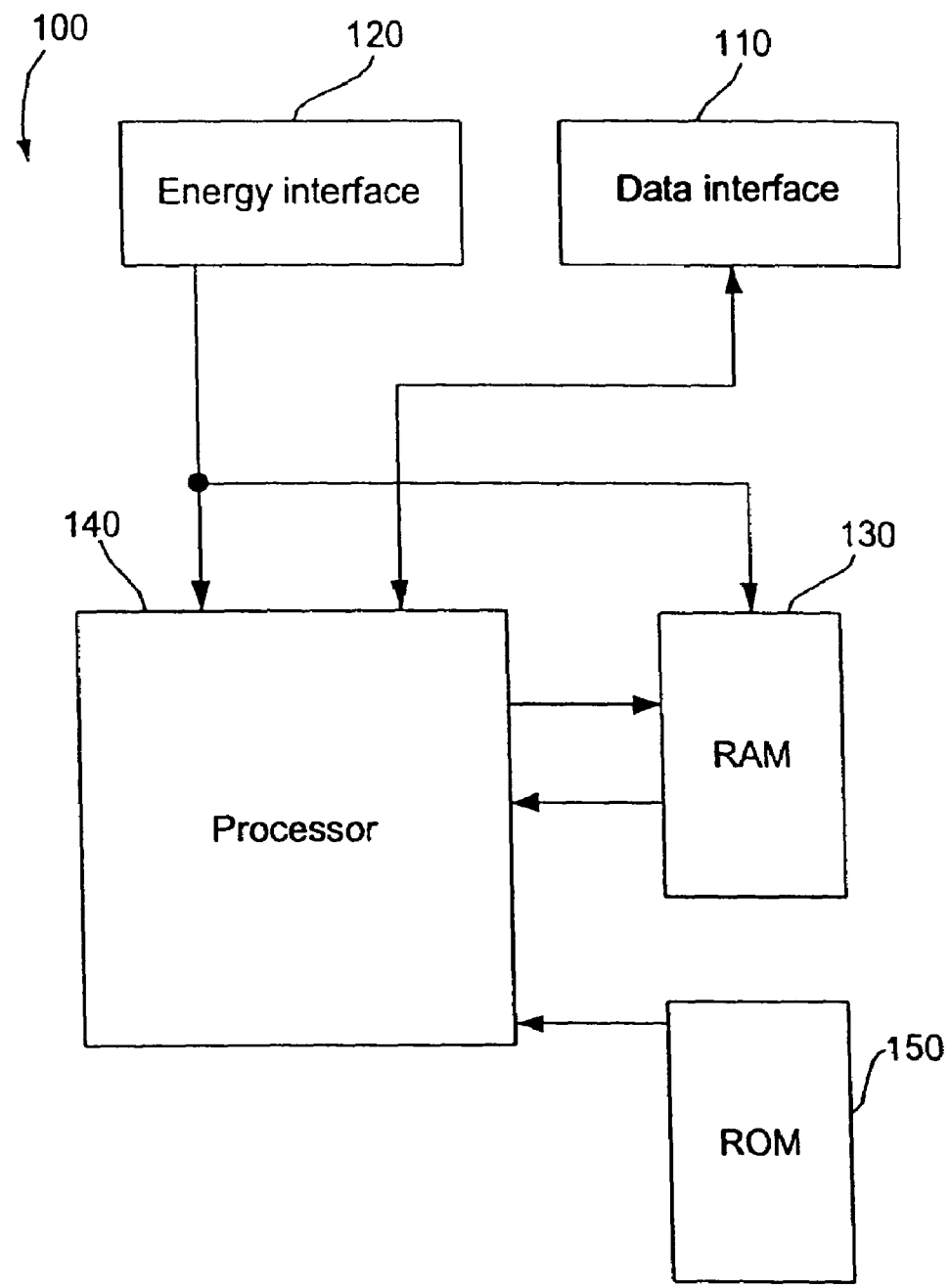
FIG. 2 shows a block diagram of a chip card structure according to an embodiment of the present invention.
Figure 3:
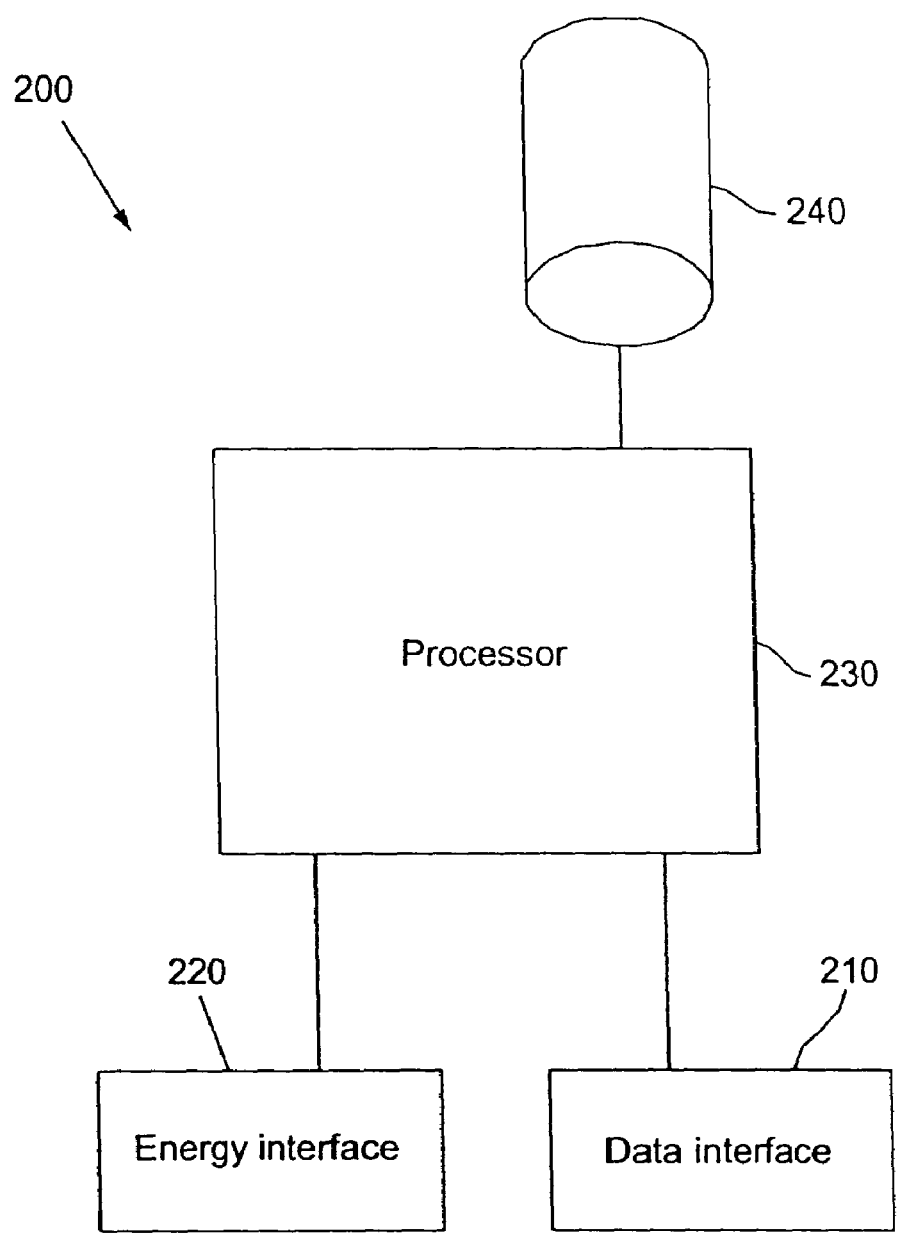
FIG. 3 shows a terminal construction according to an embodiment of the present invention.

With reference to FIG. 2 and FIG. 3, possible embodiments for the construction of a chip card and a terminal, respectively, will be described hereinafter. FIG. 2 shows a block diagram of a chip card generally designated by the reference numeral 100. Chip card 100 comprises a data interface 110, a power interface 120, a RAM 130, a processor 140 and a ROM 150. The data interface 110 is adapted to be coupled to a terminal (not shown) for example via a contactless coupling or via a contact and is capable of transmitting data from the chip card to the terminal and, vice versa, of receiving data from the terminal. The data interface 110 is connected to processor 140 whereby the data to be transmitted and received can be transmitted to and from processor 140, respectively. The power interface 120 is adapted to be coupled to the terminal as well in order to obtain power from the terminal in the form of, for example, electromagnetic energy or a supply voltage. Power interface 120 distributes the supply energy to the processor 140 and the RAM 130.

Processor 140 consists, for example, of a CPU (not shown) and a plurality of crypto coprocessors (not shown) that are controlled by the CPU and are designed for performing specific computations necessary for the one or more cryptographic algorithms implemented in chip card 100, such as e.g. modular or arithmetic computations. In addition to control of the crypto coprocessors, the CPU carries out the communication with the terminal via data interface 110 as well as memory accessing operations to ROM 150 connected to processor 140. The ROM 150 contains, for example, chip card specific information, e.g. a chip card identification number, a personal identification number, an account number, a balance or the like.

The CPU of processor 140 takes over the tasks for initializing a communication of a terminal with the chip card 100, for authentication as well as for decryption and certificate examination upon receipt of the part of the algorithm code transferred according to the invention; a program code necessary therefor may be stored in ROM 150. For performing the further communication with the terminal, e.g. for performing security-specific functions, such as the withdrawal of a balance stored in ROM 150, or a cryptographic algorithm for carrying out an account crediting/debiting transaction, the CPU of processor 140 is program-controlled by a program code which, during communication of the chip card 100 with the terminal, according to the invention, is at least in part present in RAM 130 connected to processor 140, whereas it is otherwise not present at all or just in part in ROM 150 on the chip card 100. Consequently, a potential attacker in possession of the chip card 100, as described hereinbefore, cannot carry out the security computations by way of processor 140, since parts of the algorithm code are missing and are stored in volatile memory 130 only upon communication of the chip card with the terminal.

FIG. 3 shows a block diagram illustrating the terminal construction in accordance with an embodiment of the present invention. The terminal, generally designated using the reference numeral 200, comprises a data interface 210, a power interface 220, a processor 230 connected to the data interface 210 and the power interface 220, as well as a memory 240 connected to the processor 230. The data interface 210 is adapted to be coupled to the data interface of a corresponding chip card in order to carry out a data exchange between the terminal 200 and the chip card (not shown). The power interface 220 is also adapted to be coupled to a power interface of the particular chip card in order to deliver power thereto. Processor 230 controls, for example, the sequence of operations during communication of terminal 200 with the chip card and performs, for example, the initialization, authentication, the encryption of the algorithm code to be transferred, which is stored in memory 240, the certification thereof as well as the transfer of the encrypted and certified algorithm code to the data interface 210 for transfer thereof to the chip card.

It is to be pointed out that memory 240 may already contain the algorithm code, for example, in encrypted form, so that the processor 230 need not encrypt the said code and the same is not present in uncoded text, neither in the memory 240 nor elsewhere.

With respect to the preceding description, it is pointed out that the same has referred to specific embodiments only. The mutual authentication and the encryption of the part transferred of the algorithm code as well as the certification may be omitted in specific applications, for example. Due to the very measure according to the invention, that at least part of the algorithm code is stored in a volatile memory of the chip card, it is rendered very difficult for a potential attacker to perform functions of crucial security of the chip card, such as e.g. performing encryption algorithms and accessing functions to chip card specific information, such as a balance etc., since these are not permanently stored on the chip card and thus are not in the possession of the potential attacker, but rather are lost if power is no longer received. The attempt of protecting the volatile memory against loss of this function turns out to be very difficult and may be deemed to be not realizable in practical application.

It is pointed out furthermore that the processes according to the invention, the terminal according to the invention as well as the chip card according to the invention may be implemented in a variety of ways. The corresponding steps or means may be implemented by way of software, firmware or hardware in conjunction with non-volatile memories. In addition thereto, the term chip card, as utilized hereinbefore, should not be restricted to the form of a card, but rather is to comprise also all other forms of chip carriers used in similar manner.

A current possibility of realizing the present invention consists, for example, in using a processor from the product family SLE66CX320P of the company Infineon AG, which by way of an MMU (MMU=Memory Management Unit) renders it possible to run a code stored in a RAM in that it controls memory access operations to the RAM. In the simplest case, even the transfer of encrypted jump addresses or memory addresses from the terminal to the chip card would effectively prevent a "native code" or machine code from being loaded by a potential attacker. Even with such a simple realization of the present invention, an attacker would not be able to perform the security computations in the chip card, since the jump addresses and thus the sequences would be unknown. This idea may be imparted to a customer of such a component by drafting an application note, thereby increasing the security of the application with a corresponding realization thereof in the controller software of the chip card and in the terminal software.

Potential attackers in possession of a chip card according to the invention just have the protected data, but they can neither initiate an accounting operation nor exactly determine the algorithm code. In combination with secured terminals and intelligent access protection mechanisms with respect to the reloadability of program parts, the present invention thus achieves a very high level of security.

LIST OF REFERENCE NUMERALS 10 chip card
20 terminal
100 chip card
110 data interface
120 energy interface
130 RAM
140 processor
150 ROM
200 terminal
210 data interface
220 energy interface
230 processor
240 memory

The invention claimed is:

1. A security module for use with a terminal, comprising:
a data interface adapted to be coupled to a terminal, configured to receive a first part of an algorithm code from the terminal, with the algorithm code concerning a cryptographic processing of data,
a power interface configured to receive power from the terminal;
a volatile memory configured to store the first part of the algorithm code received via the data interface, said volatile memory being coupled to the power interface in order to have power supplied thereto such that said volatile memory will be cleared upon an interruption of the receipt of the power from the terminal;
a non-volatile memory in which a second part of the algorithm code, which is a remainder of the algorithm code, is stored, wherein the first and second parts of the algorithm code form the complete algorithm code; and
a processor configured to perform the algorithm code in order to obtain an algorithm code result that can be delivered to the terminal,
wherein the first part of the algorithm code includes memory addresses of computing components necessary for performing the algorithm code and/or jump addresses of the algorithm code pointing to partial routines within the second part of the algorithm code.

2. A security module according to claim 1, wherein the data interface is adapted to receive only the first part of the algorithm code.

3. A security module according to claim 1, further comprising:
a means for performing an authentication between the terminal and the security module.

4. A security module according to claim 1,
wherein the data interface is arranged to receive from the terminal the first part of the algorithm code in encrypted form and with a certificate, with the security module further comprising:
a means for decrypting the first part of the encrypted algorithm code; and
a means for examining the certificate and for preventing performing of the algorithm code depending on the examination of said certificate.

5. A security module according to claim 1, further comprising:
a means for monitoring a predetermined security condition and for clearing the volatile memory if said predetermined security condition is fulfilled, with said security condition being selected from the group consisting of an interruption of a supply voltage, a fluctuation of the supply voltage and an interruption of a system clock.

6. A security module according to claim 1, wherein the algorithm code comprises a program code selected for carrying out a task selected from the group consisting of a symmetric cryptographic algorithm, an asymmetric cryptographic algorithm, an RSA algorithm, a cryptographic process according to the DES standard, an elliptic curve process, an access function for accessing a digital value stored on the security module and an access function for changing the digital value stored on the security module.

7. A security module according to claim 1, wherein the data interface is adapted to receive the first part of the algorithm code multiple times in different versions, with the volatile memory being arranged for being overwritten by the different versions of the first part of the algorithm code at the multiple times.

8. A security module according to claim 1, wherein said security module is designed as a chip card.

9. A process for cryptographically processing data using a security module, comprising:
receiving a first part of an algorithm code by means of an interface to a terminal, with the algorithm code concerning a cryptographic processing of data;
storing the first part of the algorithm code in a volatile memory of the security module, with the volatile memory being coupled to the interface, to be supplied with power, such that the volatile memory will be cleared upon an interruption of the receipt of the power from the terminal, wherein a second part of the algorithm code is a remainder of the algorithm code and is stored in a non-volatile memory of the security module;
performing said algorithm code on the security module in order to obtain cryptographically processed data; and
delivering said cryptographically processed data to the terminal,
wherein the first part of the algorithm code includes memory addresses of computing components necessary for performing the algorithm code and/or jump addresses of the algorithm code pointing to partial routines within the remainder of the algorithm code.

10. A process according to claim 9, further comprising removing the security module from the terminal thereby causing an interruption of the receipt of the power to the volatile memory from the terminal and clearing said volatile memory upon interruption of the receipt of power from the terminal.

11. A terminal for use with a security module having a volatile memory being able to be supplied by power from the terminal, such that the volatile memory will be cleared upon an interruption of a supply of the power, and having a non-volatile memory in which a second part of an algorithm code is stored, comprising:
a data interface adapted to be coupled to the security module, for transmitting a first part of the algorithm code from the terminal to the volatile memory of the security module and for receiving cryptographically processed data from the security module, with the algorithm code concerning a cryptographic processing of data, wherein the second part is a remainder of the algorithm code; and
a power interface adapted to deliver power to the security module, with the volatile memory being supplied by the power, such that the volatile memory will be cleared upon an interruption of the receipt of the power from the terminal, for each communication operation between the terminal and the security module, the data interface controlled to; send the first part of the algorithm code to the volatile memory of the security module and then to receive the cryptographically processed data from the security module, wherein the first part of the algorithm code includes memory addresses of computing components necessary for performing the algorithm code and/or jump addresses of the algorithm code pointing to partial routines within the remainder of the algorithm code.

12. A process for controlling a security module using a terminal in order to obtain cryptographically processed data from the security module, the process comprising, for each one of a plurality of communication operations between the terminal and the security module:

delivering power from the terminal to the security module;

transmitting a first part of an algorithm code from the terminal to a volatile memory of the security module, with the algorithm code concerning a cryptographic processing of data, with the volatile memory being supplied by the power, such that the volatile memory will be cleared upon an interruption of the receipt of the power from the terminal, and with the security module having a non-volatile memory in which a second part of the algorithm code, which is a remainder of the algorithm code, is stored; and receiving the cryptographically processed data from the security module, wherein the first part of the algorithm code includes memory addresses of computing components necessary for performing the algorithm code and/or jump addresses of the algorithm code pointing to partial routines within the remainder of the algorithm code.

13. A process for communication between a security module and a terminal, comprising:

transferring a first part of an algorithm code from the terminal to the security module, with the algorithm code concerning to a cryptographic processing of data;

storing the first part of the algorithm code in a volatile memory of the security module, with the volatile memory being supplied by power from the terminal, such that the volatile memory will be cleared upon interruption of the receipt of the power from the terminal, and with the security module having a non-volatile memory in which a second part of the algorithm code, which is a remainder of the algorithm code, is stored, performing said algorithm code on the security module in order to obtain cryptographically processed data;

delivering said cryptographically processed data to the terminal; and clearing said volatile memory upon an interruption of the receipt of the power from the terminal, wherein the first part of the algorithm code includes memory addresses of computing components necessary for performing the algorithm code and/or jump addresses of the algorithm code pointing to partial routines within the remainder of the algorithm code.

14. A process according to claim 13, further comprising:

sequentially transferring a plurality of different versions of the first part of the algorithm code; and sequentially storing the different versions of the first part of the algorithm code such that a respective previous version of the plurality of different versions of the first part of the algorithm code is overwritten.

15. A security module for use with a terminal, comprising:

a data interface adapted to be coupled to a terminal, for receiving a first part of an algorithm code from the terminal, with the algorithm code concerning a cryptographic processing of data;

a power interface configured to receive power from the terminal;

a volatile memory configured to store the first part of the algorithm code received via the data interface, said volatile memory being coupled to said power interface in order to have power supplied thereto such that the volatile memory will be cleared upon an interruption of the receipt of the power from the terminal;

a non-volatile memory in which a second part of the algorithm code which, along with the received first part of the algorithm code, forms the complete algorithm code, is stored; and a processor configured to perform the algorithm code in order to obtain cryptographically processed data that can be delivered to the terminal, wherein the first part of the algorithm code includes memory addresses of computing components necessary for performing the algorithm code and/or jump addresses of the algorithm code pointing to partial routines within the second part of the algorithm code.

* * * * *